US009189584B2

(12) United States Patent
Feldmann et al.

(10) Patent No.: US 9,189,584 B2
(45) Date of Patent: Nov. 17, 2015

(54) CROSS-TALK NOISE COMPUTATION USING MIXED INTEGER LINEAR PROGRAM PROBLEMS AND THEIR SOLUTIONS

(71) Applicant: International Business Machines Corporation, Armonk, NY (US)

(72) Inventors: Peter Feldmann, New York, NY (US); Vladimir Zolotov, Putnam Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/970,695

(22) Filed: Aug. 20, 2013

(65) Prior Publication Data
US 2015/0046892 A1    Feb. 12, 2015

Related U.S. Application Data

(63) Continuation of application No. 13/964,312, filed on Aug. 12, 2013, now abandoned.

(51) Int. Cl.
*G06F 17/50* (2006.01)
(52) U.S. Cl.
CPC ........ *G06F 17/5068* (2013.01); *G06F 17/5036* (2013.01); *G06F 2217/82* (2013.01)
(58) Field of Classification Search
CPC .. G06F 17/50; G06F 17/5022; G06F 2217/84
USPC .......................... 716/106–108, 111–115, 136
See application file for complete search history.

(56) References Cited

U.S. PATENT DOCUMENTS

| 5,568,395 A | 10/1996 | Huang |
| 6,493,853 B1 | 12/2002 | Savithri et al. |
| 6,510,540 B1 * | 1/2003 | Krauter et al. ................. 716/115 |

(Continued)

FOREIGN PATENT DOCUMENTS

| EP | 0668675 | 1/2003 |
| WO | 2012047735 | 4/2012 |

OTHER PUBLICATIONS

Firouzi et al., Modeling and Estimation of Power Supply noise using Linear Program, 2011, IEEE, pp. 537-542.*

(Continued)

*Primary Examiner* — Nghia Doan
(74) *Attorney, Agent, or Firm* — Harrington & Smith; Preston J. Young

(57) ABSTRACT

A method includes forming a mixed integer linear problem (MILP) capturing at least a plurality of timing windows over which aggressor net(s), electromagnetically coupled to a victim net in a circuit, produce computed cross-talk noise pulses potentially contributing to a maximum noise for the victim net. The MILP is solved to determine the maximum noise at the victim net. Responsive to the maximum noise meeting one or more criteria, at least an indication of the victim net is output. Forming may include forming a linear problem using overlapping timing windows for which noise pulses contribute to the maximum noise and converting the linear problem to the mixed integer linear problem by introducing into the linear problem binary variables that determine whether individual ones of overlapping or non-overlapping noise pulses from the one or more aggressor nets contribute to the maximum noise. Apparatus and program products are also disclosed.

20 Claims, 7 Drawing Sheets

(56) References Cited

U.S. PATENT DOCUMENTS 7,830,166 B2 * 11/2010 Sun et al. ............ 326/21
2003/0005398 A1 1/2003 Cho et al.

OTHER PUBLICATIONS

Humblet et al., "Crosstalk Analysis and Filter Optimization of Single- and Double-Cavity Fabry-Perot Filters," IEEE Journal on Selected Areas in Communications. vol. X. No. h. August 1990.

Kaushik et al., "Crosstalk Analysis for a CMOS-Gate-Driven Coupled Interconnects," IEEE Transactions on Computer-Aided Design of Intergrated Circuits and Systems, vol. 27, No. 6, Jun. 2008.

Sanyal et al., "Test Pattern Generation for Multiple Aggressor Crosstalk Effects Considering Gate Leakage Loading in Presence of Gate Delays," IEEE Transactions on Very Large Scale Integration (VLSI) Systems, vol. 20, No. 3, Mar. 2012.

Mondal et al., "Estimation of Capacitive Crosstalk-Induced Short-Circuit Energy." IEEE Circuits and Systems, 2007, 4 pgs.

Rajappan et al., "An Efficient Algorithm for Calculating the Worst-case Delay due to Crosstalk," IEEE Proceedings of the 21st International Conference on Computer Design, 2003, 6 pgs.

Chen, Lauren Hui, "Aggressor Alignment for Worst-Case Crosstalk Noise", IEEE Transactions on computer-Aided Design of Integrated Circuits and Systems, vol. 20, No. 5, May 2001, pp. 612-621.

Blaauw, David, "Driver Modeling and Alignment for Worst-Case Delay Noise",, IEEE Transactions on Very Large Scale Integration (VLSI) Systems, vol. 11, No. 2, Apr. 2003, pp. 157-166.

Heydari, Payam, et al., "Capacitive Coupling Noise in High-Speed VLSI Circuits", University of California, Department of Electrical and computer Engineering, 27 pgs.

Gandikota, Ravikishore, et al., "Victim Alignment in Crosstalk-Aware Timing Analysis", IEEE Transactions on Computer-Aided Design of Integrated Circuits and Systems, vol. 29, No. 2, Feb. 2010, pp. 261-274.

Shepard, Kenneth L., "Harmony: Static Noise Analysis of Deep Submicron Digital Integrated Circuits", IEEE Transactions on Computer-Aided Design of Integrated Circuits and Systems, vol. 18, No. 8, Aug. 1999, pp. 1132-1150.

* cited by examiner

CROSS-TALK NOISE COMPUTATION USING MIXED INTEGER LINEAR PROGRAM PROBLEMS AND THEIR SOLUTIONS

CROSS-REFERENCE TO RELATED APPLICATIONS

This application is a continuation of Ser. No. 13/964,312, filed on Aug. 12, 2013, entitled "CROSS-TALK NOISE COMPUTATION USING MIXED INTEGER LINEAR PROGRAM PROBLEMS AND THEIR SOLUTIONS", the disclosure of which is hereby incorporated by reference in its entirety.

BACKGROUND

This invention relates generally to analysis of very large scale integrated (VLSI) circuits and, more specifically, relates to noise analysis on VLSI circuits.

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

A number of tools are used for very large scale integrated (VLSI) circuit design. Some tools perform cross-talk noise computation for the interconnected and capacitively-coupled (e.g., and/or inductively-coupled) nets of the circuit. Typically, noise is considered to couple from one or more "aggressor" nets into a "victim" net. Noise analysis tools predict total cross-talk noise and detect potential functional and timing violations for the nets the tools examine.

Although these tools are beneficial for VLSI circuit design and analysis, the tools can be improved.

BRIEF SUMMARY

The following summary is merely intended to be exemplary. The summary is not intended to limit the scope of the claims.

A method includes forming a mixed integer linear problem (MILP) capturing at least a plurality of timing windows over which aggressor net(s), electromagnetically coupled to a victim net in a circuit, produce computed cross-talk noise pulses potentially contributing to a maximum noise for the victim net. The MILP is solved to determine the maximum noise at the victim net. Responsive to the maximum noise meeting one or more criteria, at least an indication of the victim net is output. Forming may include forming a linear problem using overlapping timing windows for which noise pulses contribute to the maximum noise and converting the linear problem to the mixed integer linear problem by introducing into the linear problem binary variables that determine whether individual ones of overlapping or non-overlapping noise pulses from the one or more aggressor nets contribute to the maximum noise. Apparatus and program products are also disclosed.

DETAILED DESCRIPTION

As stated above, there are problems with noise analysis for VLSI design. Additional description of problems is now presented.

Figure 1:
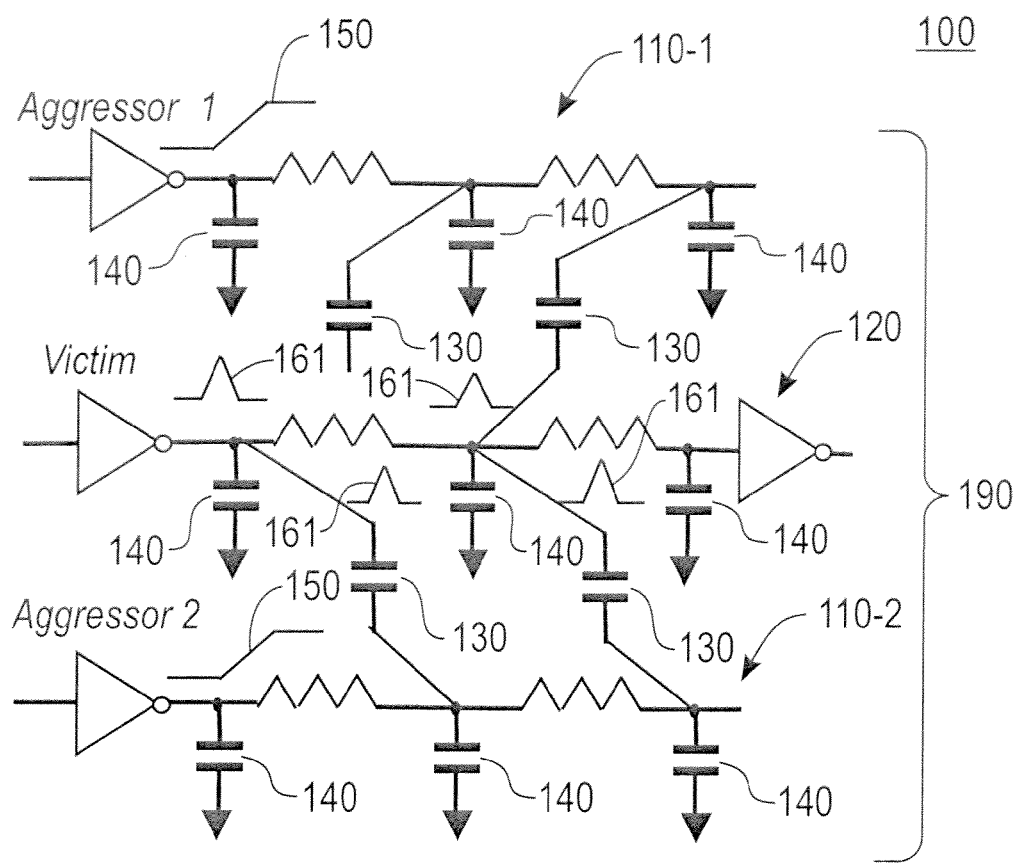
FIG. 1 is an exemplary circuit used to illustrate cross-coupling noise in VLSI design.

Turning to FIG. 1, this figure is an exemplary circuit 100 used to illustrate cross-coupling noise in VLSI design. Circuit 100 has two aggressor nets 110-1 and 110-2 (also called "aggressors 110" herein for simplicity) that are electromagnetically (e.g., capacitively and/or inductively) coupled to a victim net 120 via (in this example) capacitors 130. The three nets 110-1, 110-2 and 120 form a noise cluster 190, and there are likely many noise clusters 190 in a circuit 100 (although only one noise cluster 190 is shown in FIG. 1 for simplicity).

It is noted that the net 120 is a victim net since this net 120 is being examined for noise injected by aggressors 110 into the net 120. A typical cross-talk noise computation would construct and analyze similar clusters 190 around all the nets in the VLSI design.

The capacitors 140 are part of their respective nets 110, 120. Signal transitions 150 at aggressor nets 110 inject noise pulses into adjacent (e.g., victim) nets 120 through coupling. The injected noise is illustrated as pulses 161. This can also be seen using FIG. 2, which is an illustration of noise pulses from aggressor nets 110 that are coupled to a victim net 120 and how these contribute to a total noise. These noise pulses are commonly referred to as cross-talk or coupling noise.

Figure 2:
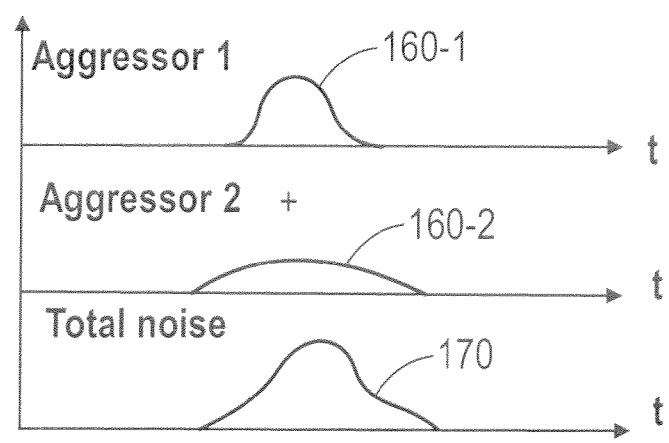
FIG. 2 is an illustration of noise pulses from aggressor nets that are coupled to a victim net and how these contribute to a total noise.

These noise pulses can affect the logic state of the victim net, producing functional failure, or can affect net delay, producing timing failure. Noise pulses 160 of many aggressors are combined into total noise pulse 170, as shown in FIG. 2. Pulses 160-1, 160-2, and the like are pulses injected by each aggressor, i.e., aggressor 1, aggressor 2, and the like, correspondingly. So pulses 160-1, 160-2 corresponds to pulses 161 shown on FIG. 1. These noise pulses affect a victim net only when the victim net is sensitive to noise, typically when signal transitions occur for the victim and the aggressors at same time, and a value is about to be latched by the victim.

Noise analysis tools should predict total cross-talk noise and report potential functional and timing violations. The above considerations should be taken into account for this prediction.

Figure 3:
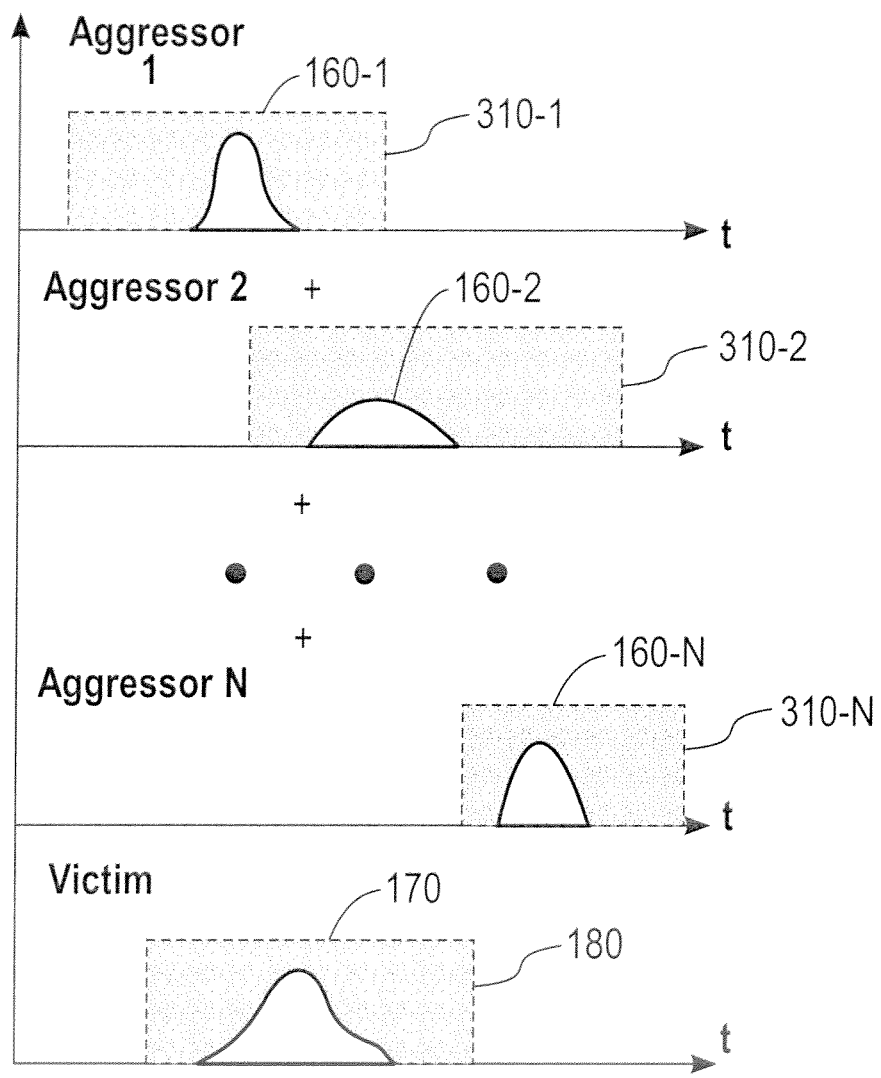
FIG. 3 is an illustration of noise pulses alignment and timing windows for aggressors and victim.

However, there are additional considerations, as described with reference to FIG. 3, which illustrates noise pulses alignment and timing windows. In FIG. 3, exemplary noise pulses 160 for N aggressors are shown, along with timing windows 310 for each of the noise pulses 160. As can be seen, some of the timing windows 310 do not align with each other and/or the timing sensitivity window 180 of the victim, so only the portion of the pulses 160 that are within the timing sensitivity window 180 contribute to the total noise 170 (e.g., a total injected pulse) caused at the victim 120.

The exact time of signal transitions is not known at time of design. Specifically, signals arrive from many paths with different delays, and signal arrival time depends on process and environmental variations. Timing can predict only timing windows of aggressor transitions and victim sensitivity. Noise analysis has to find aggressors 110 that can switch simultaneously and also determine maximum possible noise injection. This may be further limited by constrained aggressor switching (e.g., only certain combinations of aggressors are allowed to switch simultaneously) and victim sensitivity windows 180. Existing solutions do not address these types of variability correctly. Instead, variability is taken into account by widening timing windows. This approach is too pessimistic, resulting in longer design time, higher power consumption, and lower chip performance.

Exemplary embodiments herein provide improvements over the techniques previously described. Exemplary embodiments formulate the problem of finding a largest possible cross talk disturbance as a Mixed-Integer-Linear-Programming (MILP) problem. Exemplary and non-limiting advantages include availability of state-of-the-art general purpose solvers (e.g., CPLEX) and ease of extending the formulation as technology progresses and the noise problem evolves, e.g., incorporation of process variation modeling, logic/timing constraints, noise shape factors, and the like. CPLEX is a high-performance mathematical programming solver for linear programming, mixed integer programming, and quadratic programming.

A problem definition and a brief overview of certain exemplary embodiments will now be described. Subsequently, a detailed description of exemplary embodiments will be described.

Figure 4:
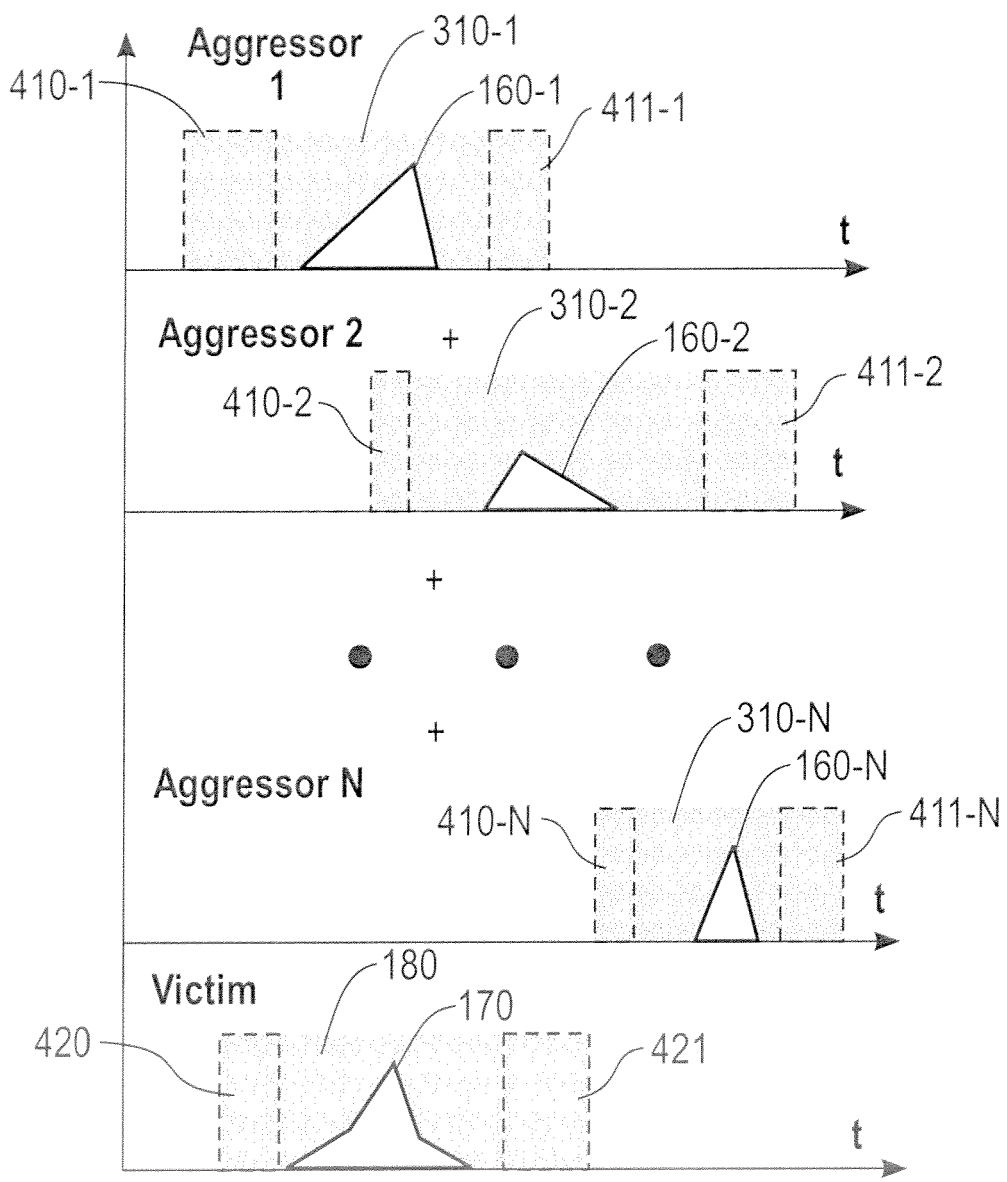
FIG. 4 is an illustration of noise pulses alignment and timing windows for aggressors and victim, wherein the timing windows include start and stop time variations.

For the problem definition and a brief overview, refer to FIG. 4, which is an illustration of noise pulses alignment and timing windows, wherein the timing windows include start and stop time variations. Assume the following. Noise pulses $h_i$ (e.g., triangle, trapezoidal, and the like) are injected at time moments $t_i$ subject to timing windows $T_{S,i} \le t_i \le T_{E,i}$. In FIG. 4, portions 410 of the windows 310 correspond to the start moment and portions 411 of the windows 310 correspond to the end moment. Start and end moments of timing windows can be expressed as functions of variations of n process and environmental parameters:

$$T_{S,i} = t_{S,0,i} + \sum_{j=1}^{n} a_{S,j,i} \Delta X_j, \text{ and}$$

$$T_{E,i} = t_{E,0,i} + \sum_{j=1}^{n} a_{E,j,i} \Delta X_j.$$

It should be noted that i is index of an aggressor (i.e., noise pulse) and j is index of a variational parameter. Variations of parameters $X_j$ are limited as per the following:

$$\Delta X_{m,j} \le \Delta X^j \le \Delta X_{M,j}.$$

It should be noted that references 410, 411 indicate variations of beginning and end times of timing windows of the aggressors 110. References 420, 421 indicate variations of beginning and end of timing sensitivity window of the victim 120. While aggressor timing windows specify time intervals when each aggressor can have signal transitions, a victim sensitivity window specifies a time interval when the victim is susceptible to injected noise. Outside this interval, the victim is not vulnerable and cannot be affected by any noise. Based on the above, compute the subset I of $N_{act}$ active aggressors injecting maximum total noise:

$$\max_{I} \sum_{i_k \in I} h_{i_k}.$$

$N_{act}$ is the number of the aggressors with non-zero contribution to maximum total noise. $N_{act}$ can be smaller than total number of aggressors, i.e. N, because not all aggressors contribute non-zero noise to the maximum total noise due to alignment restrictions. In order to distinguish the number of aggressors contributing non-zero noise from the total number of aggressors N, N is changed in the equation above to $N_{act}$. It is further noted that $i_k$ is the index of an aggressor with non-zero contribution to total maximum noise injected into a victim net. Here, only the contributions of the aggressors having non-zero contribution to total noise are considered. In the MILP formulation below, all contributions, including zero ones, are summed.

It is possible to formulate the problem of computing maximum noise with timing windows affected by process and environmental variations as a mixed integer linear program problem (MILP). As an introduction, in an exemplary embodiment, such formulation may be performed by formulating linear inequalities describing a point inside triangle (or other) pulse, formulating a linear program (LP) problem for a maximum noise constrained with intersecting windows, and extending the LP problem into an MILP problem for a general case of deterministic timing windows, which can be not intersecting with each other. The MILP problem may be optionally extended for variational timing windows. Additional optional extensions of the MILP problem are also possible.

Benefits of formulating the problem of computing maximum noise with timing windows affected by process and environmental variations as a MILP include the following. There are efficient algorithms and software packages for solving MILPs (e.g. CPLEX). The number of independent of variables for a typical noise computation is not very large; typically, this number is of the order of the number of aggressor nets (~10). The general formulation can be easily extended to take into account other additional constraints and requirements, such as the following: continuity of noise to small timing variations; restrictions to a number of simultaneously switching aggressor nets; constraints on a number of switching aggressors, where the constraints result from logic functionality of the circuit; and any convex noise pulse shape (e.g., trapezoidal). Further, use of standard packages simplifies software development.

Figure 5:
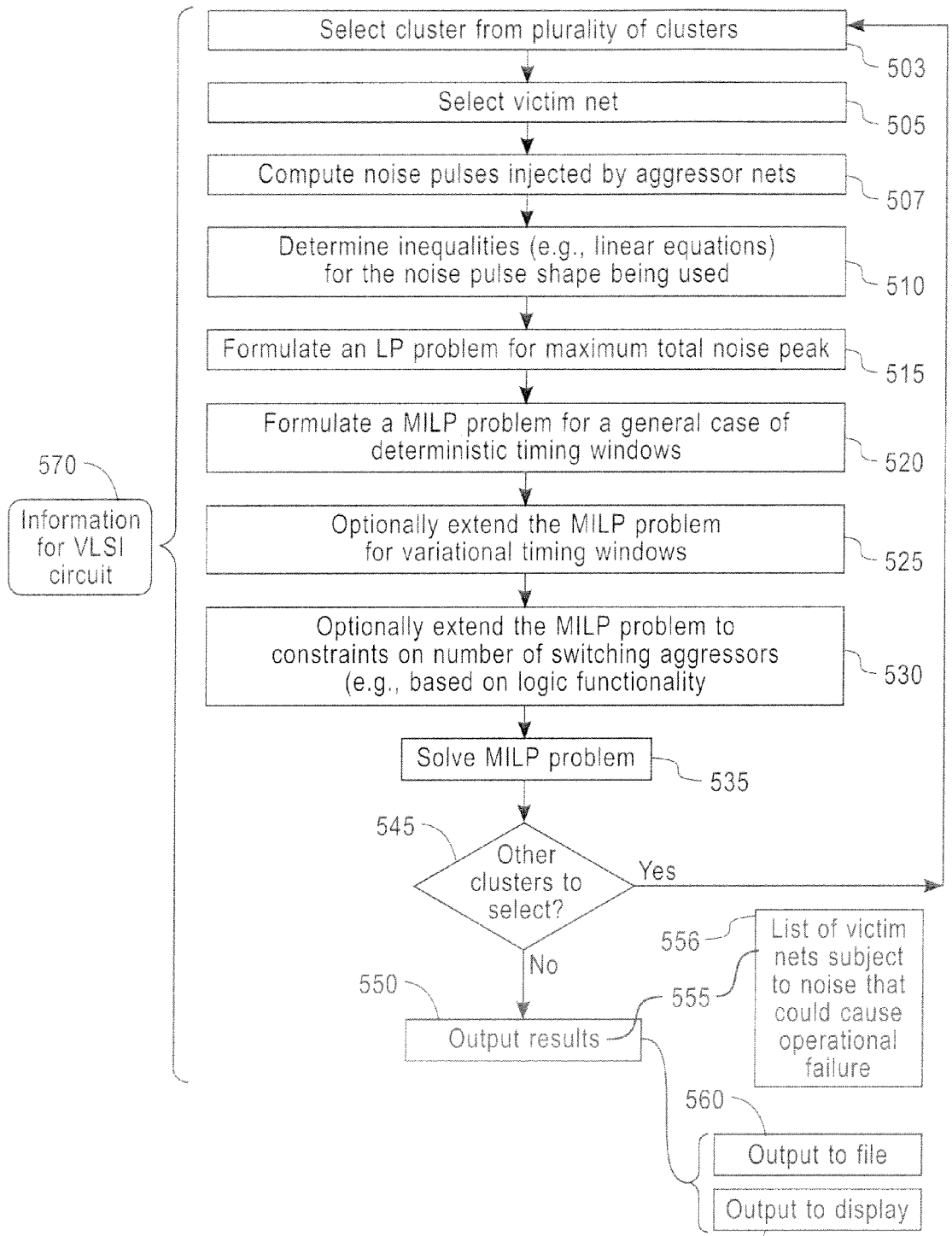
FIG. 5 is a logic flow diagram for cross-talk noise computation using mixed integer linear program problems and their solutions, and illustrates the operation of an exemplary method, a result of execution of computer program instructions embodied on a computer readable memory, and/or functions performed by logic implemented in hardware, in accordance with an exemplary embodiment.

Now that an introduction has been provided, a more detailed description of an exemplary embodiment is presented. Turning to FIG. 5, a logic flow diagram is shown for cross-talk noise computation using mixed integer linear program problems and their solutions. FIG. 5 further illustrates the operation of an exemplary method, a result of execution of computer program instructions embodied on a computer readable memory, and/or functions performed by logic implemented in hardware, in accordance with an exemplary embodiment. Further, each of the blocks may be considered to represent, where appropriate, interconnected means for perform corresponding functions in the blocks.

In FIG. 5, the information 570 for a VLSI circuit provides input to various blocks of the flow. A VLSI circuit typically has many clusters of nets (e.g., noise clusters 190), which are defined by the information 570. Information 570 is a source for input data. However, the information 570 may not provide all information directly. For instance, some information is from the manufacturing process used to manufacture the circuit and from requirements to circuit operating conditions. Instead, there are other design automation tools constructing the required information. For example, timing windows are constructed from information computed by statistical timing analysis. A statistical timing analysis tool is variation aware timing tool. The techniques of computing noise for variational windows are intended to be used as part of a variation-aware noise analysis tool. However this disclosure does not require any details on other parts of the variation aware noise analysis tool.

It is noted that the flow diagram in FIG. 5 can be considered as an explanation of derivation of a MILP formulation. However, the flow diagram can be also considered as computing (by a computer) equalities and inequalities (actually coefficients of their terms, possibly in matrix form) of a MILP problem for a given noise cluster 190 of many noise clusters 190 in the VLSI circuit. More specifically, although a human may design the algorithm, a computer computes all equations and inequalities of MILP formulation in the form of a set of their coefficients or in a matrix form, which is more common, and then solves the formulated MILP problem. Each noise cluster 190 has its own MILP problem to be formulated and solved, with its own number of variables, equations, inequalities and coefficients. Usually the formulation and solution is performed in a matrix form.

Consequently, in block 503, one of the clusters of nets is selected. Many of the blocks 505-535 are performed relative to some victim net 120. Typically, a noise cluster by definition is a victim net plus all nets coupled to that victim net. The nets coupled to the victim net play the role of aggressor in that noise cluster. So each victim net defines its noise cluster. A noise analysis tool usually operates as follows:

1. Select a victim net.
2 Find all nets coupled to the victim net, consider these nets as aggressor nets and create the noise cluster.
3. Analyze the noise cluster.
4. If there are more victim nets to analyze (noise clusters to analyze) go to (1) to analyze next victim net and its noise cluster.

Thus, in block 505, a victim net 120 is selected, e.g., by a computer system using the information 570. In block 507, the operation of computing noise pulses injected by aggressor nets is performed. The noise pulses in certain examples herein are approximated with triangles. However, the described techniques can be used for other convex shapes of the noise pulses.

Figure 6:
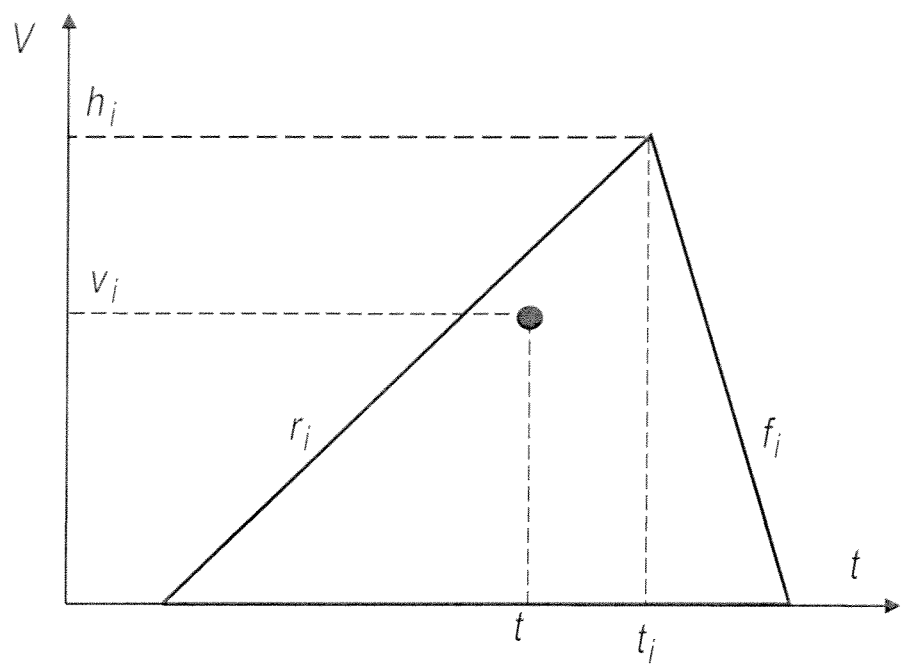
FIG. 6 shows a triangle used for noise pulses and corresponding definitions regarding the triangle.

In block 510, the operation of determining inequalities (e.g., linear equations) for the noise pulse shape being used is performed. Concerning formulating linear inequalities for a point inside a triangular noise pulse, reference may be made to FIG. 6, which shows a triangle and corresponding definitions regarding the same. The triangular noise pulse of FIG. 6 is further defined as follows:

$h_i$—height of pulse;
$t_i$—time of pulse peak;
$r_i$—rising slope of pulse ($r_i$>0); and
$f_i$—falling slope of pulse ($f_i$>0).

The point inside the triangular noise pulse is defined via the following:

t—time coordinate; and
$v_i$—voltage coordinate.

It is noted that a triangle is used in the example of FIG. 6, but other convex noise pulse shapes may be used. Using these definitions, the following inequalities are determined:

$$(v_i - h_i) - r_i(t - t_i) \leq 0$$

$$(v_i - h_i) - f_i(t - t^i) \leq 0$$

$$v_i \geq 0$$

In block 515 of FIG. 5, the operation of formulating an LP problem for maximum total noise peak is performed assuming that timing windows intersect with each other. Briefly, a linear program LP is formed with all aggressor noise pulses. The LP will be infeasible when not all aggressor pulses overlap. These concepts are described in more detail below.

Figure 7:
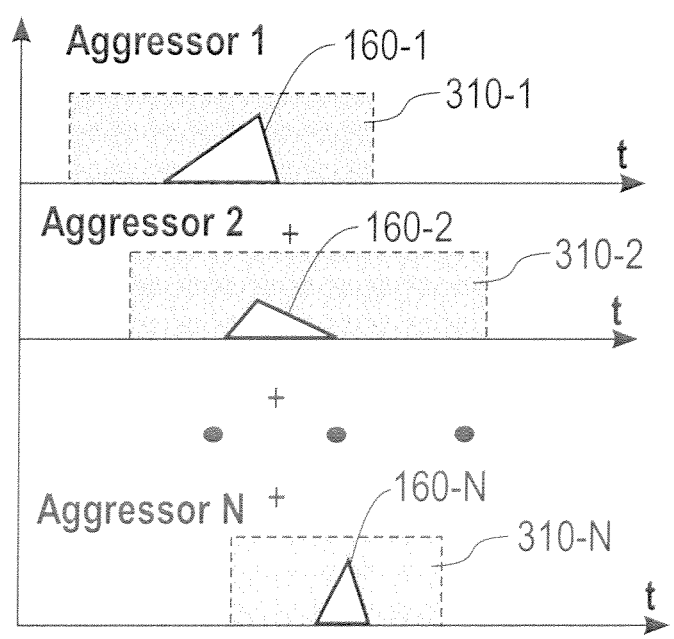
FIG. 7 is an illustration of noise pulses alignment and timing windows and is used to illustrate an LP for determining maximum noise with intersecting deterministic windows.

Referring to FIG. 7, this figure is an illustration of noise pulses alignment and timing windows and is used to illustrate an LP for determining maximum noise with intersecting deterministic windows. Regarding the LP, assume each noise pulse is restricted with its timing window:

$$T_{S,i} \leq t_i \leq T_{E,i}.$$

Also assume the intersection of all timing windows 310 is not empty. The peak pulse will be determined by the superposition of n of the time shifted pulses. The superposition is captured by the common abscissa t corresponding to the magnitude $v_i$ of each pulse. The time shift is completely specified by the peak abscissa $t_i$.

Based on this information, formulate the linear problem for a maximum total noise peak as the following:

$$\max_{t, t_i} \sum_{i=1}^{N} v_i \text{ subject to } \begin{array}{c} (v_i - h_i) - r_i(t - t_i) \leq 0 \\ (v_i - h_i) - f_i(t - t_i) \leq 0 \\ v_i \geq 0 \\ T_{S,i} \leq t_i \leq T_{E,i} \end{array}$$

Each $T_{S,i}$ here is for a variational problem a linear form. So in this flow diagram, block 515 being executed by a computer program computes symbols that following blocks will expand into linear forms.

The LP problem solves a maximum noise problem for a set of windows that all overlap in time. If one includes non-overlapping windows, the LP problem has no solution. Therefore, a problem of interest is how to find the maximum noise pulse over all possible subsets of overlapping windows. A naive procedure is as follows: 1) enumerate all subsets over overlapping windows; 2) formulate and compute the LP just for that subset; 3) if the LP has solution, keep the maximum noise pulse.

We implement the above by introducing selection variables (in this example, the binary variables $p_i$) into the LP. This transforms the LP into a MILP and allows modeling all possible subsets of windows while simultaneously ensuring the feasibility of the maximum noise solution. Typically, a MILP solver finds the maximum noise by exploring only a small subset of overlapping subsets of noise pulses, but the techniques for the MILP are up to the solver being used.

As illustrated in block 520, a MILP for maximum noise with general deterministic timing windows may be formulated. In this instance, the timing windows may be in general positions and the intersection of all the timing windows need not be empty. The term deterministic here is used in sense of "not variational". Variational timing windows are timing windows dependent on process and environmental parameters are generated by so called statistical timing analysis tool. Deterministic, i.e., variation independent timing windows, are generated by conventional (deterministic) timing analyzers. It is also noted that the MILP formulation for deterministic timing windows has its own value if there is no information on detailed variational representation of timing windows. A set of discrete (e.g., binary integer) variables $p_i$ may be used that determine whether individual pulses are to contribute to maximum total noise peak. It is shown next how to incorporate the discrete variables into pulse defining constraints in a way that preserves the linearity of the objective function and constraints. In effect, the value of the discrete variable $p_i=0$ forces the maximum contribution from a pulse to be zero.

The MILP is formulated to a maximum total noise peak:

$$\max_{t, t_i, p_i} \sum_{i=1}^{N} v_i \text{ subject to } \begin{array}{l} (v_i - p_i h_i) - r_i(t - t_i) \leq 0 \\ (v_i - p_i h_i) - f_i(t - t_i) \leq 0 \\ v_i \geq 0 \\ (p_i - 1)T_\infty + T_{S,i} \leq t_i \leq T_{E,i} + (1 - p_i)T_\infty \\ 0 \leq p_i \leq 1 \ p_i \text{ is integer} \\ T_\infty \text{ is large constant} \end{array}$$

A shown above, $T_\infty$ is a large constant. For instance, $T_\infty$ may be larger than the clock period or larger than any window. Its role is to neutralize (when $p_i=0$), the constraint corresponding to the non-overlapping window, and render the LP feasible. The subset under study is defined by all the pulses for which $p_i$ is 1 (one, in this example). It is noted that this MILP problem may be solved by a MILP solver, although additional extensions, some of which are described below, may be used to extend the MILP problem.

Regarding the discrete variables, when $p_i$ is 1 (one), the i-th pulse participates in the subset: the constraints are introduced exactly as formulated in the original LP. When $p_i$ is 0 (zero, in this example), the time window is extended sufficiently (e.g., by $T_\infty$) so that the time window fully overlaps with all other time windows. Simultaneously, the peak of the noise pulse is reduced to 0 (zero). The consequence is that the LP remains feasible (e.g., overlap guaranteed) but the contribution of the i-th noise pulse is zero. Together, these settings mean that one simply excludes that aggressor from consideration because the case is considered when the window of that aggressor does not intersect with other windows. This way, a MILP solver investigates different combinations of intersecting windows.

Existing sophisticated implementations of MILP solvers ensure that the enumeration of possible subsets is not exhaustive. The true optimum is often found after solving a "small" number of LPs (e.g., by using strategies such as branch and bound, branch and cut, and the like).

An exemplary feature of an exemplary embodiment is the fact the problem formulation remains linear: the problem formulation is a mixed Integer linear problem. Linearity brings the guarantee of global optimality and MILP solvers are very well developed.

Figure 8:
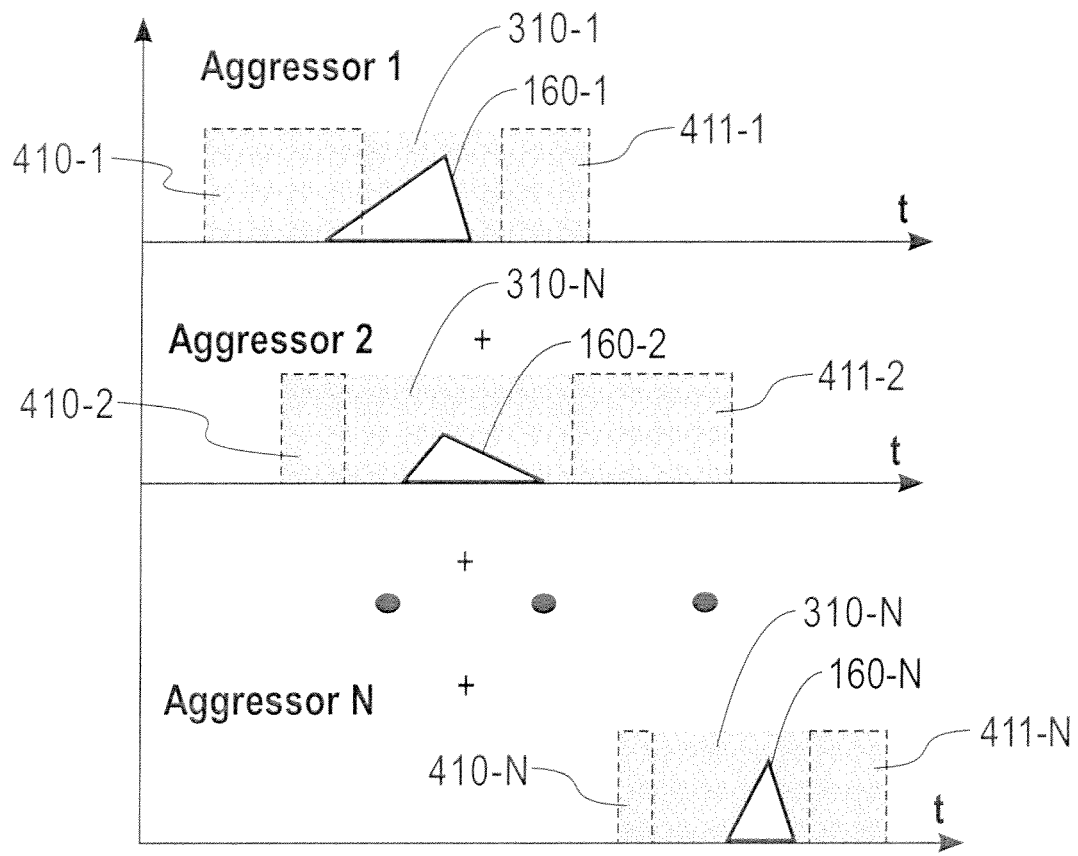
FIG. 8 is an illustration of noise pulses alignment and timing windows with variable start and stop times and is used to illustrate a MILP for determining a maximum noise peak.

In block 525 of FIG. 5, the MILP problem may be optionally extended for variational timing windows. FIG. 8 is an illustration of noise pulses alignment and timing windows with variable start and stop times and is used to illustrate a MILP for determining a maximum noise peak. Variations of process and environmental parameters result in variation of start and end points of timing windows. For example, temperature, supply voltage, transistor channel length, wire width, metal thickness, dielectric thickness, transistor threshold voltage are variational parameters. More specifically, process parameters are the parameters associated with the manufacturing process of the circuit under analysis. These parameters could be geometrical, e.g., the effective width of length of a transistor, oxide thickness, etc., or electrical, e.g., metal resistivity, dielectric constant, etc. Environmental parameters refer to the operating conditions of the circuit, e.g., local temperature, or supply voltage. All these parameters have nominal values, however for multiple reasons these parameters are subject to variations. One major design task is to ensure that the circuit will perform according to specifications even when subjected to these variations. In an example herein, $T_{S,i}$ and $T_{E,i}$ are functions of variational parameters $X_j$. Conventionally, linear approximation is used for approximating effect of process and environmental variations. Therefore, start and end points $T_{S,i}$ and $T_{E,i}$ of timing windows are expressed with the following linear forms:

$$T_{E,i} = t_{E,0,i} + \sum_{j=1}^{n} a_{E,j,i} \Delta X_j;$$

$$T_{S,i} = t_{S,0,i} + \sum_{j=1}^{n} a_{S,j,i} \Delta X_j.$$

The $a_{S,j,i}$ here are sensitivities of beginning and end of timing windows to variations of process and environmental parameters. Substituting linear expressions of start and end points $T_{S,i}$ and $T_{E,i}$ into the MILP formulation and adding constraints of variational parameters $X_j$, one may obtain the MILP formulation, shown below, of the alignment problem for variational windows.

$$\max_{t, t_i, T_{S,i}, T_{E,i}, \Delta X, p_i} \sum_{i=1}^{N} v_i \text{ subject to } \begin{array}{l} (v_i - p_i h_i) - r_i(t - t_i) \leq 0 \\ (v_i - p_i h_i) - f_i(t - t_i) \leq 0 \\ v_i \geq 0 \\ (p_i - 1)T_\infty + T_{S,i} \leq t_i \leq T_{E,i} + (1 - p_i)T_\infty \\ 0 \leq p_i \leq 1 \\ T_{E,i} = t_{E,0,i} + \sum_{j=1}^{n} a_{E,j,i} \Delta X_j \\ T_{S,i} = t_{S,0,i} + \sum_{j=1}^{n} a_{S,j,i} \Delta X_j \\ \Delta X_{m,j} \leq \Delta X_j \leq \Delta X_{M,j} \end{array}$$

As above, $p_i$ is an integer and $T_\infty$ is a large constant.

In block 530, the MILP problem may be optionally further extended to constraints on a number of simultaneously switching aggressors. For instance, only a predetermined number of aggressor nets (e.g., for a particular cluster) may be constrained. As another example, the constraints constrain a number of switching aggressors, but the constraints result from logic functionality of the circuit. That is, aggressor signals may have switching constraints due to circuit design (e.g., which defines the logic functionality of the circuit). Often, this kind of constraint limits the number of signals that can be switched simultaneously. Without taking into account this kind of constraint, computation of noise pulses can be too conservative. Fortunately, by adding constraint $\Sigma_{k \in G} p \leq q$, one can limit the number of pulses injected by the aggressors belonging to a set. The constraint in the form of $\Sigma_{k \in G} p_k = q$ specifies that in the group G exactly q aggressors can switch simultaneously. This equation may also be used to account for logic functionality, e.g., such that based on a logic function, only a certain number of aggressors will be switching simultaneously. One can formulate the MILP for a maximum noise peak as follows:

$$\max_{t, t_i, T_{S,i}, T_{E,i}, \Delta X, p_i} \sum_{i=1}^{N} v_i \text{ subject to}$$

$$(v_i - p_i h_i) - r_i(t - t_i) \leq 0$$
$$(v_i - p_i h_i) - f_i(t - t_i) \leq 0$$
$$v_i \geq 0$$
$$(p_i - 1)T_\infty + T_{S,i} \leq t_i \leq T_{E,i} + (1 - p_i)T_\infty$$
$$0 \leq p_i \leq 1$$
$$T_{E,i} = t_{E,0,i} + \sum_{j=1}^{n} a_{E,j,i} \Delta X_j$$
$$T_{S,i} = t_{S,0,i} + \sum_{j=1}^{n} a_{S,j,i} \Delta X_j$$
$$\Delta X_{m,j} \leq \Delta X_j \leq \Delta X_{M,j}$$
$$\sum_{k \in G} p_k \leq q$$

The variables $p_i$ and $T_\infty$ are as above.

Once the MILP problem of blocks 520, 525, or 530 has been formulated, the MILP problem is solved in block 535. The MILP problem may be solved by any number of MILP solvers, such as CPLEX, which is a high-performance mathematical programming solver for linear programming, mixed integer programming, and quadratic programming.

For each noise cluster, the MILP problem is formulated and solved individually. It is the function of the computer to formulate the MILP problem for each noise cluster individually, using information about its noise pulses and timing windows. Moreover, even the set of variational parameters can be different because different noise clusters may depend on different layers of metal interconnects or different transistor families. Noise analysis tools formulate and solve many (possibly millions) of these MILP problems.

Once the MILP problem has been solved, it is determined if there are other clusters to select in block 545. If so (block 545=Yes), then the flow proceeds to block 503, where another cluster is selected. Generally, every cluster in the information 570 for the VLSI circuit will be selected. In some implementations it is possible to select and process noise clusters not sequentially (one after another) but in parallel. This is beneficial when multithreading, multicore and/or multiprocessor computers are used.

If all clusters have been selected (block 545=No), in block 550, a computer system outputs the results 555. The results 555 could be a list 556 of victim nets subject to noise that could cause operational failure. The noise that could cause operational failure is function of other blocks of a noise analysis tool. There are many methods for this. For example, there can be designer-defined threshold so that noise higher than that is considered a failure. Noise pulses can be propagated to circuit latches, where the noise pulses are checked if the pulses change a value stored in the latch. Yet other methods are possible. That is, only those results meeting certain criteria would be output. The results 500 could be output to a file (block 560) and/or output to a display (block 565). The file may be communicated via a network interface. The total maximum injected noise can be also used for determining of the victim delay change due to the injected noise, which is also called noise on delay or noise on timing.

Solving that MLIP problem, we also compute the set of aggressors contributing non-zero noise to total maximum injected noise and the timing alignment of aggressor pulses resulting in injection of the maximum noise. This information can be useful for more accurate computation of the combined noise using nonlinear models of noise clusters and/or for modifying the circuit to reduce or avoid the impact of coupling noise.

It is noted that the equations presented above are merely exemplary. Multiple changes could be made to these equations.

The following are additional possible, non-limiting extensions of the above techniques. For instance, a victim sensitivity window may be considered, such that the victim is considered to be susceptible to noise at a particular time (e.g., within its window 180). Variational parameters may be computed that limit worst-case noise. That is, the computer system may compute active variables that constrain the solution, which indicates what kind of parameters are important. Computation of a worst process and environmental corner (the one that results in the largest pulse) may be performed. The whole set of variational parameters that affect noise are commonly referred to as a corner. For instance, the computer system may compute at what temperature or other variable the worst noise occurs. The MILP may use non-triangle noise pulses, such as rectangular, trapezoidal, or arbitrary convex piece wise linear functions. Non-rectangular timing windows may be used, such as trapezoidal (where pulses near the edge of the trapezoid are limited), or arbitrary convex piece wise linear function.

Figure 9:
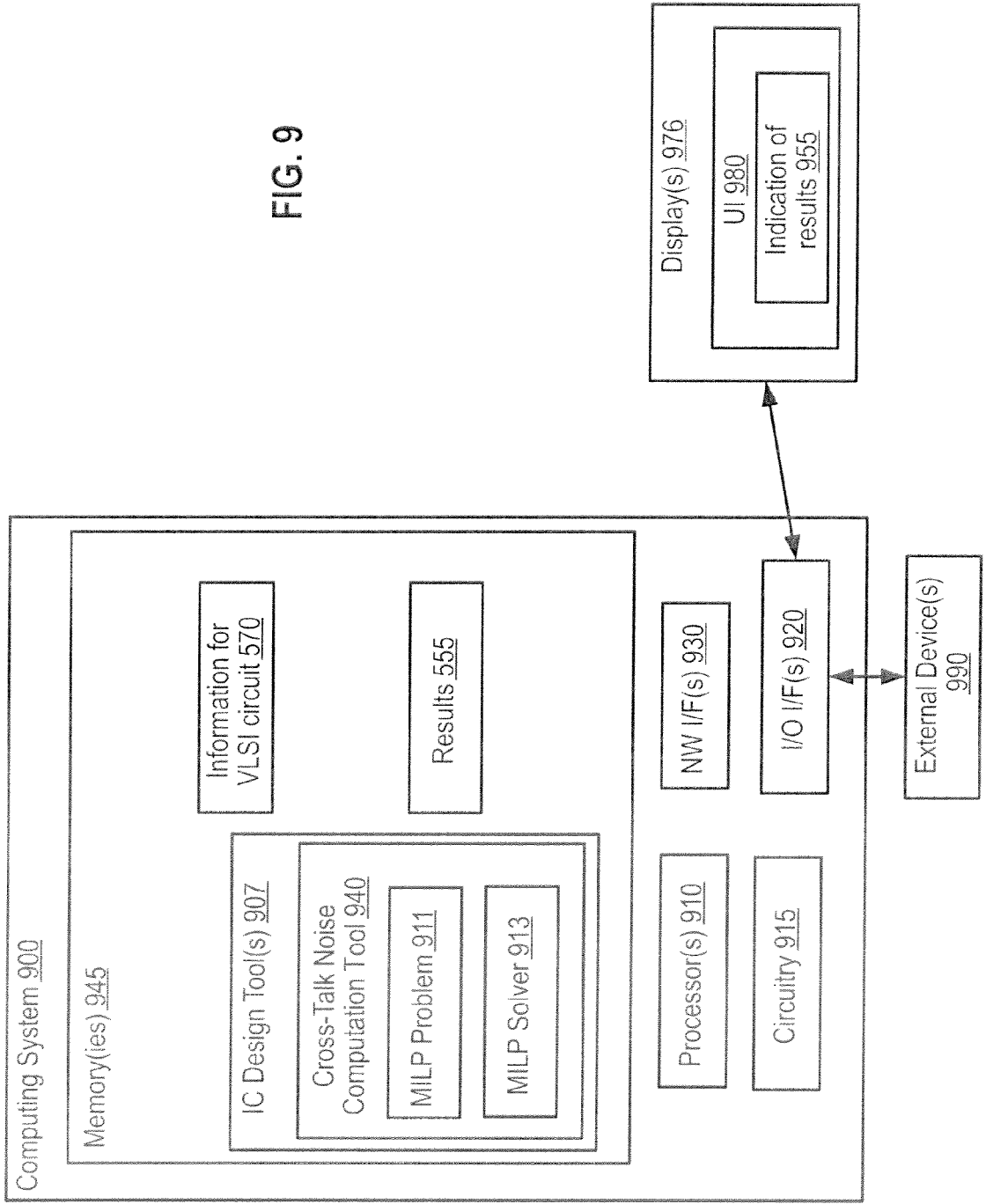
FIG. 9 is a block diagram of an example of a system suitable for performing the exemplary embodiments herein.

Referring to FIG. 9, this figure provides an overview of a computing system 900 suitable for use with exemplary embodiments herein. The computing system 900 comprises one or more memories 945, one or more processors 910, one or more I/O interfaces 920, and one or more wired or wireless network interfaces 930. Alternatively or in addition to the one or more processors 910, the computing system 900 may comprise circuitry 915. The computing system 900 is coupled to or includes one or more displays 976 and one or more external device(s) 990. In one example, IC design tool(s) 907 (including a cross-talk noise computation tool 940, which includes a MILP problem 911, and a MILP solver 913), information 570 for a VLSI circuit, and results 555 exist in the one or more memories 945. The cross-talk noise computation tool 940 may be variation aware, as described above. The cross-talk noise computation tool 940 is implemented in an exemplary embodiment as computer-readable program code that is executable by the one or more processors 910 to cause the computing system 900 to perform one or more of the operations described herein. In another example, the operations may also be performed, in part or completely, by circuitry 915 that implements logic to carry out the operations. The circuitry 915 may be implemented as part of the one or more processors 910 or may be separate from the one or more processors 910.

The processors 910 may be any processing units, such as digital signal processors and/or single-core or multi-core general purpose processors. The circuitry 915 may be any electronic circuit such as an application specific integrated circuit or programmable logic. The memories 945 may comprise non-volatile and/or volatile RAM (random access memory), cache memory, NAND-based flash memory, long term storage (e.g., hard drive), and/or read only memory. The one or more I/O interfaces 920 may include interfaces through which a user may interact with the computing system 900. The display(s) 976 may be a touchscreen, flatscreen, monitor, television, projector, as examples.

In one embodiment, users interact with the ID design tool(s) 907 to finalize an IC design, such as a VLSI circuit, the information for which is stored in information 570. A user interacts with the cross-talk noise computation tool 940 through the UI 980 on the display 976 in an exemplary embodiment or through the network interface(s) 930 in another non-limiting embodiment. The external device(s) 990 enable a user to interact in one exemplary embodiment with the computing system 900 and may include a mouse, trackball, keyboard, and the like. The network interfaces 930 may be wired and/or wireless and may implement a number of protocols, such as cellular or local area network protocols. The elements in computing system 900 may be interconnected through any technology, such as buses, traces on a board, interconnects on semiconductors, and the like.

The cross-talk noise computation tool 940 generates results 555 as described above, e.g., by applying the MILP solver 913 to the MILP problem 911. An indication 955 of the results could be shown on UE 980 and displayed to a user or sent via the network interface(s) 930 to a user. As described above, the results 555 could be a list 556 of victim nets subject to noise that could cause operational failure, and the indication 955 would be viewable version of the list 556.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium does not include propagating signals and may be, for example, but is not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable storage medium does not include a propagating wave.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An apparatus, comprising:
one or more memories comprising computer-readable code;
one or more processors,
wherein the one or more processors are configured, in response to execution of the computer-readable code, to cause the apparatus to perform the following:
forming a mixed integer linear problem capturing at least a plurality of timing windows over which one or more aggressor nets, electromagnetically coupled to a victim net in a circuit, produce computed cross-talk noise pulses potentially contributing to a maximum noise for the victim net, wherein at least some of the plurality of the timing windows do not align at least with each other or with a timing sensitivity window of the victim net;
solving the mixed integer linear problem to determine the maximum noise at the victim net; and
outputting, responsive to the maximum noise meeting one or more criteria, at least an indication the victim net; and
using an analysis of the at least one indication to control a process for manufacturing the circuit.

2. The apparatus of claim 1, wherein forming further comprises forming a linear problem using overlapping timing windows for which noise pulses contribute to the maximum noise and converting the linear problem to the mixed integer linear problem by introducing into the linear problem binary variables that determine whether individual ones of overlapping or non-overlapping noise pulses from the one or more aggressor nets contribute to the maximum noise.

3. The apparatus of claim 2, wherein forming further comprises forming the mixed integer linear program so that when a binary variable for an i-th noise pulse is a first value, the i-th pulse participates in a subset, but when the binary variable to the i-the noise pulse is a second value, the consequence is that the linear program remains feasible but the contribution of the i-th noise pulse to the subset is zero.

4. The apparatus of claim 2, wherein the mixed integer linear problem further captures start and end points of timing windows that are functions of a plurality of variational parameters comprising process and environmental parameters.

5. The apparatus of claim 4, wherein the mixed integer linear problem further captures constraints on a number of switching aggressors, the constraints allowing only a predetermined number of aggressor nets to switch simultaneously.

6. The apparatus of claim 4, wherein the mixed integer linear problem further captures constraints on a number of switching aggressors, the constraints resulting from logic functionality of the circuit.

7. The apparatus of claim 4, wherein determining the maximum noise further comprises computing active variational parameters that constrain a solution to the mixed integer linear problem.

8. The apparatus of claim 4, wherein determining the maximum noise further comprises computing a worst corner comprising a whole set of variational parameters that affect the maximum noise.

9. The apparatus of claim 4, wherein the timing windows are not rectangular.

10. The apparatus of claim 1, wherein:
the one or more processors are further configured, in response to execution of the computer-readable code, to cause the apparatus to perform the forming and solving for a plurality of clusters in the circuit; and
outputting further comprises, responsive to maximum noises for certain victim nets meeting the one or more criteria, outputting indications of the certain victim nets.

11. The apparatus of claim 1, wherein the one or more criteria comprise a voltage over which the maximum noise may cause operational failure of the victim net.

12. The apparatus of claim 1, wherein the mixed integer linear problem further captures a victim sensitivity window.

13. The apparatus of claim 1, wherein the mixed integer linear problem further captures simulated noise pulses having a particular pulse shape.

14. The apparatus of claim 13, wherein the particular pulse shape comprises one of a triangle, a rectangle, a trapezoid, or an arbitrary convex piece wise linear function.

15. The apparatus of claim 1, wherein the solving of the mixed integer linear problem further determines a set of aggressor nets contributing non-zero noise to a total maximum injected noise.

16. The apparatus of claim 1, wherein the solving of the mixed integer linear problem further determines a timing alignment of aggressor pulses resulting in injection of the maximum noise.

17. The apparatus of claim 1, wherein the indication indicates a modification to the circuit to reduce or avoid the maximum noise impacting the victim net.

18. A computer program product comprising a non-transitory computer readable storage medium having program code embodied therewith, the program code executable by a computing system to cause the computing system to perform:
forming a mixed integer linear problem capturing at least a plurality of timing windows over which one or more aggressor nets, electromagnetically coupled to a victim net in a circuit, produce computed cross-talk noise pulses potentially contributing to a maximum noise for the victim net, wherein at least some of the plurality of the timing windows do not align at least with each other or with a timing sensitivity window of the victim net;
solving the mixed integer linear problem to determine the maximum noise at the victim net; and
outputting, responsive to the maximum noise meeting one or more criteria, at least an indication the victim net; and
using an analysis of the at least one indication to control a process for manufacturing the circuit.

19. A method comprising:
forming by a computer system a mixed integer linear problem capturing at least a plurality of timing windows over which one or more aggressor nets, electromagnetically coupled to a victim net in a circuit, produce computed cross-talk noise pulses potentially contributing to a maximum noise for the victim net, wherein at least some of the plurality of the timing windows do not align at least with each other or with a timing sensitivity window of the victim net;

solving the mixed integer linear problem to determine the maximum noise at the victim net;

outputting by the computer system, responsive to the maximum noise meeting one or more criteria, at least an indication of the victim net; and using an analysis of the at least one indication to control a process for manufacturing the circuit.

20. The method of claim 19, wherein the indication indicates a modification to the circuit to reduce or avoid the maximum noise impacting the victim net.

* * * * *